J. H. WONSER.
SAND BOX.
APPLICATION FILED FEB. 11, 1919.
1,349,704.
Patented Aug. 17, 1920.
2 SHEETS—SHEET 1.
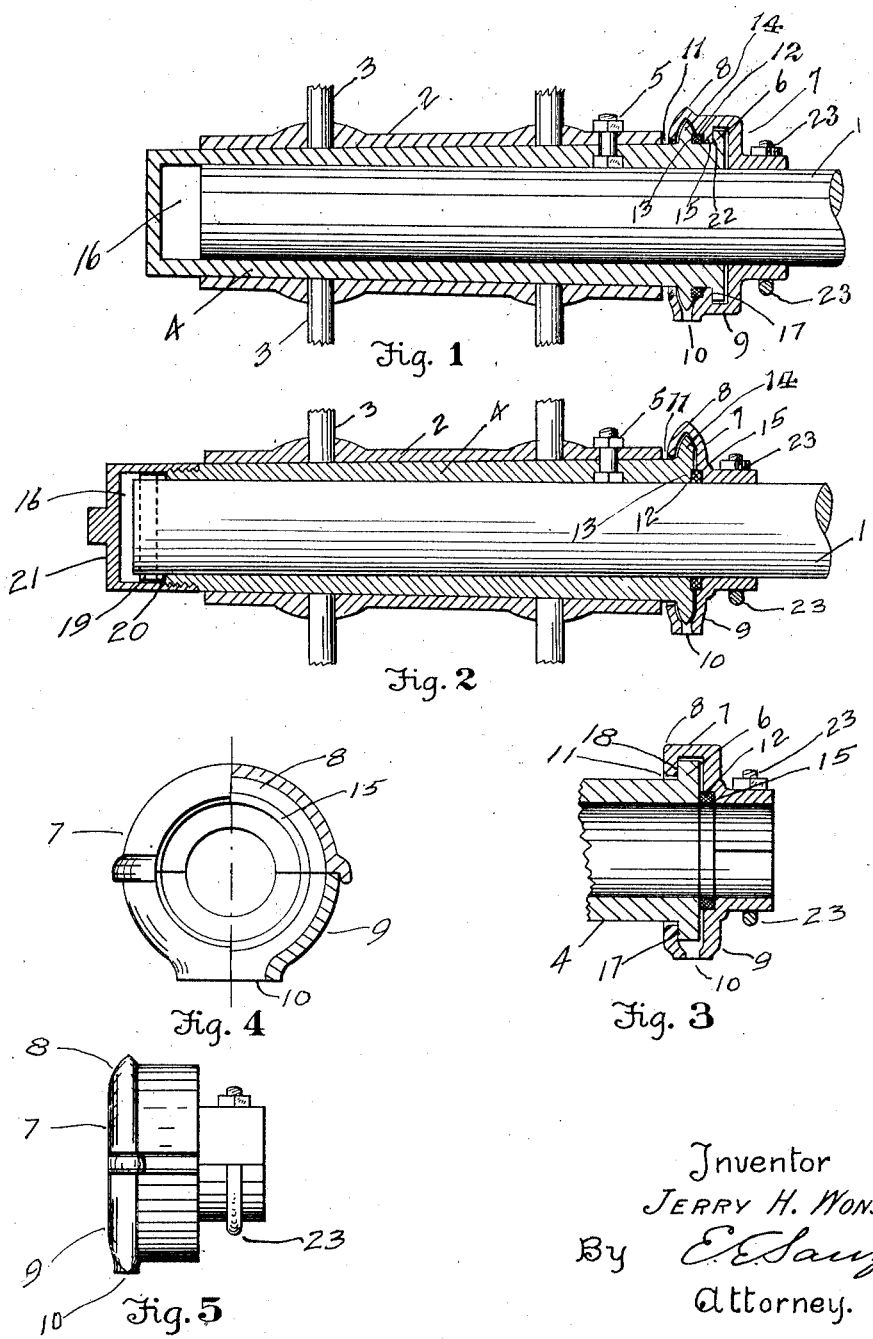
Inventor
JERRY H. WONSER
By E. E. Sauzé
Attorney.

J. H. WONSER.
SAND BOX.
APPLICATION FILED FEB. 11, 1919.

1,349,704.

Patented Aug. 17, 1920.
2 SHEETS—SHEET 2.

Inventor
JERRY H. WONSER
By E. Sauzé
Attorney.

UNITED STATES PATENT OFFICE.

JERRY H. WONSER, OF EUREKA, WASHINGTON.

SAND-BOX.

1,349,704.  Specification of Letters Patent.  Patented Aug. 17, 1920.

Application filed February 11, 1919. Serial No. 276,294.

*To all whom it may concern:*

Be it known that I, JERRY H. WONSER, a citizen of the United States, residing at Eureka, in the county of Walla Walla and State of Washington, have invented certain new and useful Improvements in Sand-Boxes, of which the following is a specification.

This invention relates to an improvement in sand-boxes and has for its object to provide a means of preventing dust from entering the journaled portion of a hub and axle from the inner end thereof, and to further provide a means for attaching wheels to an axle, as more particularly used on farm implements, in such a manner that no dirt may enter and cause undue friction and attrition.

With this and other objects in view reference is had to the accompanying drawings, in which—

Figure 1 is a sectional elevation showing the preferred form of my invention and its application;

Fig. 2 is a sectional elevation of a modification;

Fig. 3 is a partial view, in section, showing my invention modified for use on the present sleeve;

Fig. 4 is a front elevation of the sand-box, partly in section;

Fig. 5 is a side elevation of the sand-box;

Figure 6:
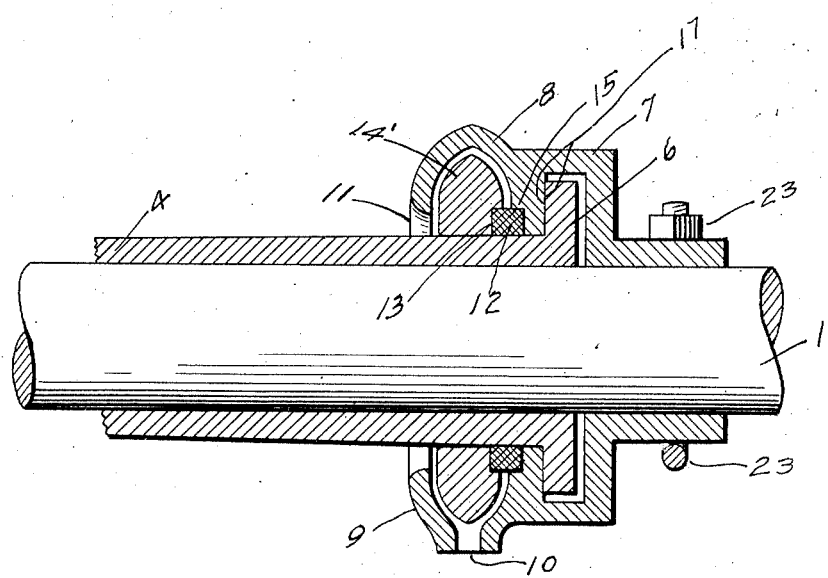
Fig. 6 is a sectional elevation showing the application of the loose flange.

In the drawings 1 represents the axle of a plow, or other apparatus designed to mount a wheel, a hub 2 and spokes 3 broken away. The tire is not shown as it has no bearing in the case.

The present hub 2 has an interior sleeve 4 interposed between the axle 1 and the hub 2 which acts as a journal box for the hub, and which is rigidly attached to the hub by the bolt 5 joining the two together. On the inner end of the sleeve is a peripheral flange 6 about which a clamping device (not shown) is fastened, being held rigid to the axle and revolubly engaging the flange 6 of the sleeve 4 for the purpose of revolubly attaching the wheel to the axle.

Many kinds of clamping devices are used for this purpose and many of the devices are termed sand-boxes, in common parlance meaning a box designed to prevent sand or other abrasive from entering between two surfaces operating at variance, but which, in fact, and from the very nature of their design, permit entrance of, and retain the sand or grit, causing friction and attrition to the two surfaces.

In my invention I provide a cylindrical sand-box 7 having an upper channeled semi-cylindrical section 8, a lower channeled semi-cylindrical section 9 (the two sections forming a cylinder) having in the bottom or lower portion preferably an orifice 10 to permit egress of any grit which may enter the joint between the sand-box and the sleeve as at the point 11, before it has had opportunity to work its way between the axle 1 and the sleeve 4, a space being left between the curved peripheral flange 6 and the channeled cylindrical part of the sand-box, 8 and 9 respectively, that the movement of the grit toward the bottom, and thus the orifice 10 may not be impeded. The finer particles of dust which might otherwise gradually work into the bearings are prevented from so doing by the gasket 12, which is received by the recess 13 in the peripheral flange 14 and the recess 15 in the sand-box 7; the two recesses holding the gasket movably in place when the whole is assembled. Now, oil or grease may be supplied to the cavity 16, and this lubricant working back through the hub lubricates the bearing surfaces at 17 and passing onward must percolate through or about the gasket carrying with it the finer particles of dust, thus absolutely preventing even the finer particles from entering the journal.

In Fig. 3 I show my invention adapted to the present sleeve wherein the sand-box must serve to retain the sleeve (and with it the hub) upon the axle. In this case I show the space about the peripheral flange 6, the gasket 12 almost wholly received by the recess 15, and the peripheral flange 6 in contact with the front wall 18 of the sand-box 7 which holds the hub on the axle.

Figures 7, 8, 9:
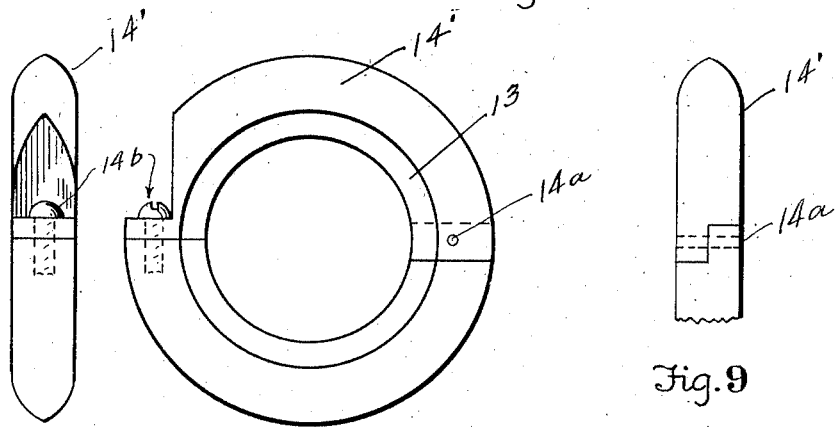
Fig. 7 is a side elevation of the loose flange.
Fig. 8 is an end elevation of the loose flange showing its fastening means.
Fig. 9 is an end elevation of the loose flange showing the hinged portion.

While this form may be used under some conditions it is not recommended as the wearing surfaces are exposed to the grit. To prevent this I will employ a loose peripheral flange 14′, Fig. 7, which may be attached to the sleeve by the pin 14ª and the screw 14ᵇ, or in any suitable manner which will thus keep the grit from the wearing surfaces.

By this means one general form of sand-box may be used for the various designs of sleeves.

In Fig. 2 I show a standard method of retaining the hub on the axle by means of the pin 19 and the washer 20 which is covered by the screw cap 21. In this case it is obvious that the peripheral flange 6 does not need to be in contact with the front wall 18 of the sand-box to hold the wheel on the axle. The screw cap prevents grit from entering the outer end of the journal and as the peripheral flange does not bear against the front wall 18, this permits the space on both sides of the peripheral flange, giving greater passageway for grit.

In Fig. 1 I show my preferred form which is a combination of the forms shown in Figs. 3 and 2. In this case I employ a pair of peripheral flanges 6 and 14 respectively, with a recess in the curved flange 14 to partly receive the gasket 12 and with the rear peripheral flange 6 bearing against the shoulder 22, the gasket 12 being held in place by the recesses 13 and 15 respectively.

In use the gasket is placed over the axle or sleeve, as the case may require; the hub is placed on the axle; the sand-box, being separated, is placed over the axle and the peripheral flanges of the sleeve, the recess in the sand-box naturally registering with the gasket; the U bolt or other clamping means 23 applied and tightened, bringing the two sections of the sand-box in rigid contact with the axle.

No oiling device is shown as any means of lubrication may be employed. Preference, however, is given to the use of grease placed in the cavity 16, which naturally works out through the gasket 12 as above explained.

It is obvious that the peripheral flanges may be constructed on the sleeve if desired. It is also obvious that the peripheral flanges may be constructed on the hub if desired.

Various changes may be resorted to within the scope of the invention without departing from the spirit thereof.

Having thus described my invention, I claim

1. The combination with a hub and axle of a sand-box, comprised of channeled sections, one of the sections having an orifice in the bottom thereof, said sections having a recess to accommodate a gasket, a gasket in said recess, and a U bolt binding the sections together upon the hub and axle.

2. The combination with a hub and axle, of a sand-box, comprised of a pair of channeled sections, one of said sections having an orifice in the bottom thereof, said sections having a recess to accommodate a gasket, a gasket in said recess, a sleeve having a peripheral flange and a recess in the flange to register with and receive the above mentioned gasket, and a means for binding the sections together about the sleeve and upon the axle.

3. The combination with an axle, of a sand-box, comprised of channeled sections, one of said sections having an orifice in the bottom thereof, said sections having an interior recess to accommodate a gasket, a gasket in said recess, a sleeve having a pair of peripheral flanges, a recess in one of the flanges to register with and receive the above mentioned gasket, and means for binding the sections together, rigidly about the axle, and revolubly upon the flanges of the above mentioned sleeve.

4. The combination with an axle, of a sand-box, comprised of channeled sections, one of said sections having an orifice in the bottom thereof, said section having an interior recess to accommodate a gasket, a gasket in said recess, a sleeve having a peripheral flange, a loose flange adapted to be attached to the sleeve and to register with the channeled sections, a recess in the loose flange to register with and receive the above mentioned gasket, and a means for binding the sections together, rigidly about the axle, and revolubly upon the flanges.

In testimony whereof I affix my signature.

JERRY H. WONSER.